United States Patent [19]

Kauser et al.

[11] Patent Number: 5,724,660
[45] Date of Patent: Mar. 3, 1998

[54] METHOD AND APPARATUS FOR LOCATING A MOBILE STATION BY COMPARING CALCULATED LOCATION AREA WITH GPS COORDINATES

[75] Inventors: Nicolas Kauser; Alan Denis MacDonald, both of Bellevue, Wash.

[73] Assignee: AT&T Wireless Services, Inc., Middletown, N.J.

[21] Appl. No.: 603,793

[22] Filed: Feb. 20, 1996

Related U.S. Application Data

[63] Continuation-in-part of Ser. No. 472,082, Jun. 7, 1995.
[51] Int. Cl.⁶ .................... G01C 21/00; G01S 3/02; H04B 7/26
[52] U.S. Cl. .............. 455/456; 455/67.1; 364/449.8; 342/451
[58] Field of Search ............................ 455/54.1, 56.1, 455/67.1, 33.1, 33.4, 33.2, 67.6, 524, 456, 457, 440; 379/59, 60; 342/457, 357, 451, 452, 450, 463; 364/449.1, 449.8, 449.9, 449.95, 449.7

[56] References Cited

U.S. PATENT DOCUMENTS

| | | | |
|---|---|---|---|
| 4,903,212 | 2/1990 | Yokouchi et al. | 364/449.95 |
| 5,043,736 | 8/1991 | Darnell et al. | 342/357 |
| 5,055,851 | 10/1991 | Sheffer | 455/54.1 |
| 5,272,483 | 12/1993 | Kato | 342/357 |
| 5,293,318 | 3/1994 | Fukushima | 364/449.95 |
| 5,365,447 | 11/1994 | Dennis | 342/357 |
| 5,390,124 | 2/1995 | Kyrtsos | 464/449.9 |
| 5,390,339 | 2/1995 | Bruckert et al. | 455/56.1 |
| 5,422,813 | 6/1995 | Schuchman | 455/440 |
| 5,479,482 | 12/1995 | Grimes | 379/59 |
| 5,504,482 | 4/1996 | Schreder | 364/449.7 |

Primary Examiner—Reinhard J. Eisenzopf
Assistant Examiner—Lester G. Kincaid

[57] ABSTRACT

A method and apparatus for determining the location of a mobile telephone within the serving area of a mobile telephone system. A mobile switching center analyzes the calling mobile telephone number and called telephone number to determine if a location function is required. Upon initiation of the location function by the mobile switching center, a mobile location module calculates a location estimate of the mobile telephone. The mobile location module receives a list of signal strengths received by the mobile telephone from cell site antennas within the serving area. The distance between the mobile telephone and a plurality of cell site antennas is calculated using a technique which reduces the error component of the calculated distances. These reduced error distances are used to geometrically determine an estimate of the location area. In addition, the mobile telephone comprises a GPS receiver/processor for sending the most recent GPS coordinates of the mobile telephone which are within a predetermined confidence level to the mobile location module. These GPS coordinates are compared with the calculated location area to increase the accuracy of the location determination.

32 Claims, 6 Drawing Sheets

| CELL | SS |
|---|---|
| 1 | $RSSI_1$ |
| 2 | $RSSI_2$ |
| 3 | $RSSI_3$ |
| 4 | $RSSI_4$ |
| 5 | $RSSI_5$ |
| 6 | $RSSI_6$ |

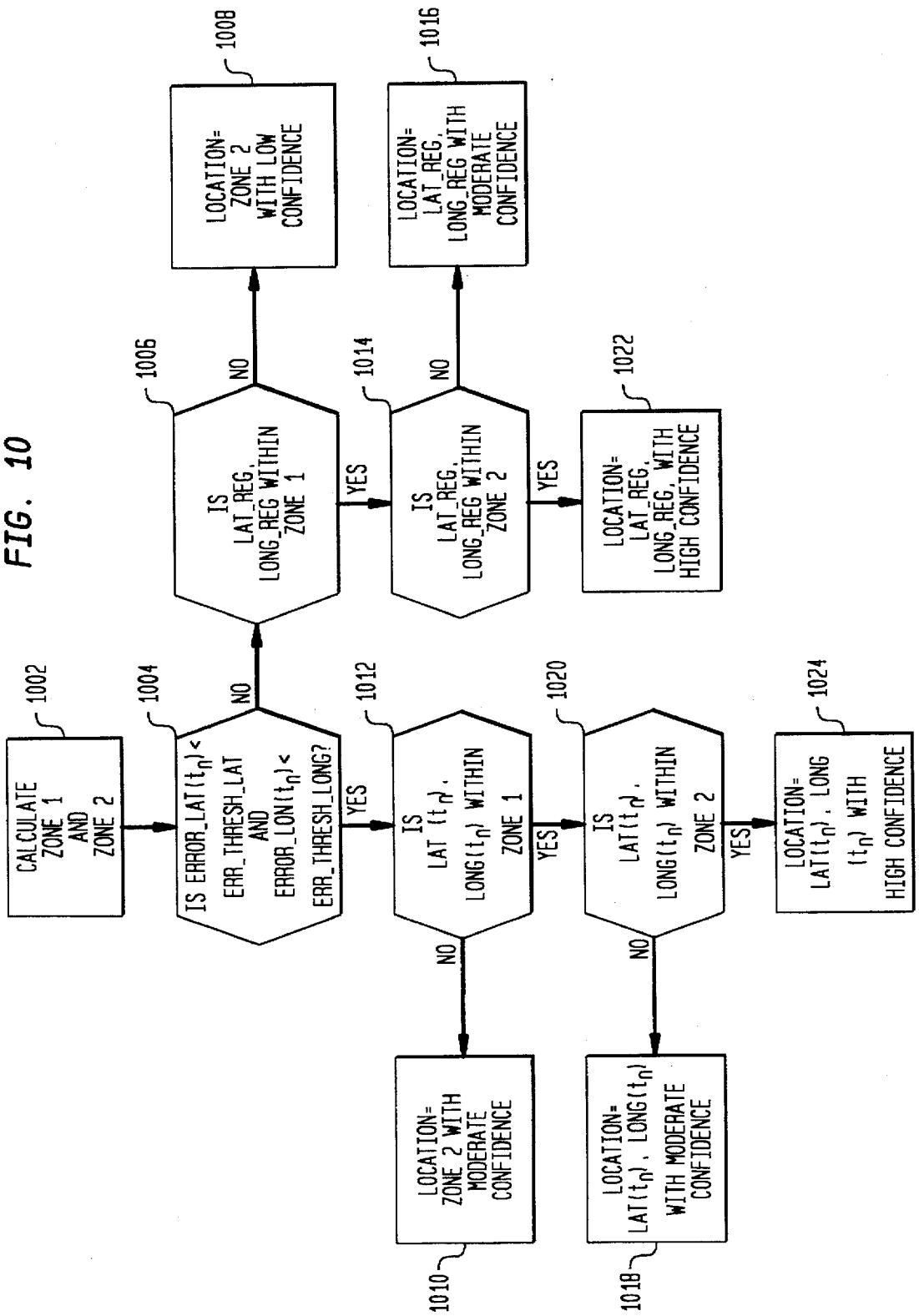

METHOD AND APPARATUS FOR LOCATING A MOBILE STATION BY COMPARING CALCULATED LOCATION AREA WITH GPS COORDINATES

This application is a continuation-in-part of copending U.S. patent application Ser. No. 08/472,082 (attorney docket no. MacDonald 1), filed Jun. 7, 1995, entitled Method And Apparatus For Determining The Location Of A Mobile Telephone.

FIELD OF THE INVENTION

The present invention relates generally to mobile telephone systems. More particularly, the present invention relates to determining the location of a mobile telephone within the geographic serving area of a mobile telephone system.

BACKGROUND OF THE INVENTION

Mobile telephone systems, also called cellular telephone systems, are becoming increasingly popular. These systems are generally made up of cell sites, each of which serves a coverage area, or cell. The cell site is the location within a cell which contains the required hardware (e.g. antenna(s) and radio base station) to communicate with the mobile telephones. A mobile telephone operating within a particular cell in the system communicates with the mobile telephone system through the cell site covering that cell. The various cell sites are connected to a mobile switching center which connects the mobile telephone system to the land-line telephone network.

One reason for the popularity of mobile telephones is that they can be used for emergencies when outside the home. For example, a motorist could use the mobile telephone to call for assistance in case of a disabled vehicle. Many areas provide a special emergency cellular telephone number. In other areas, users can dial 911, just as they would from a conventional land-line telephone.

One of the problems with using the mobile telephone for emergencies stems from the mobility of the telephone. Public service providers, such as police, do not know the location of the mobile telephone calling the emergency number. In addition, users who call the emergency number often cannot provide enough location information to allow the public service provider to find them. Thus, it is desirable to provide a mobile telephone system which can determine the location of a mobile telephone and provide that information to public service providers, for example the police.

Such a mobile telephone location service would be desirable in other contexts besides emergency responses. For example, a mobile telephone user who is lost may request location information from the mobile telephone system provider. The location information could be passed to the user from the system. Yet another user for such a system would be companies which operate fleets of vehicles. A home base for company operations could keep track of the locations of its vehicles by using a mobile telephone location service. Of course, there are many other applications for such a system.

In known techniques for mobile telephone location, the distance between a mobile telephone and a mobile telephone system antenna in a cell site can be determined by analyzing the signal strength of a communication signal between the cell site antenna and the mobile telephone. If the distance between the mobile telephone and a number of cell site antennas is calculated, the approximate location of the mobile telephone can be determined by a geometric process such as triangulation.

U.S. Pat. No. 4,891,650 describes a vehicle location system which determines an approximate vehicle location using a cellular telephone system. The location function is initiated when a vehicle transmits an alarm signal to nearby cell sites. The cell sites receiving this alarm signal analyze the received alarm signal to determine its signal strength. The cell sites then send signal strength information through the mobile telephone system to an alarm central station. The alarm central station then uses the signal strengths reported from various cells to determine an approximate location of the vehicle. A more accurate location is achieved by sending out actual tracking vehicles to the approximate location calculated by the central station. A disadvantage of this system is that each of the cell sites requires additional components which will generate and send an appropriate signal strength report message to a mobile telecommunications switching office. The mobile telecommunications switching office also needs special functionality to send appropriate information to a central tracking station which will determine an approximate location of the vehicle using the signal strengths.

U.S. Pat. No. 5,218,367 describes a vehicle tracking system which uses signal strengths received from nearby cells to calculate an approximate vehicle location. In this system, a special purpose mobile telephone determines signal strengths being received from nearby cells and generates and sends an appropriate alarm message, including signal strength information, to a central station via the mobile telephone system. The central station then uses this information to determine an approximate location of the vehicle. The system can improve upon the accuracy of the approximate location if the cells are divided into sectors and particular information about the antennas in these sectors is used. Once an approximate location is found, a more accurate location is achieved by sending out actual tracking vehicles to the approximate location calculated by the central station.

The technique described in U.S. Pat. No. 4,891,650 requires additional components in each of the cell sites in order to generate and send appropriate signal strength report messages. Since there are many such cells in a mobile telephone system, such additional components are undesirable. Thus, there is a need for a mobile telephone location system which does not require additional components at each cell site.

Further, the location techniques described in the above patents does not calculate an accurate location of the mobile telephone. The accuracy of the location is improved by sending out actual tracking vehicles. However, the need for such vehicles makes these techniques very expensive. Thus, there is a need for a technique which will improve the accuracy of a location estimate calculated with signal strengths.

SUMMARY OF THE INVENTION

The present invention provides a method and apparatus for accurately determining the location of a mobile telephone within a mobile telephone system serving area.

In accordance with one embodiment of the invention, the location of a mobile telephone is determined using a geometric location technique in combination with GPS location coordinates produced by a GPS processor/receiver within the mobile telephone. A mobile location module within the mobile telephone system receives data representing the signal strengths of the signals surrounding the mobile telephone, which signals are being transmitted from cell site antennas of the mobile telephone system. The distances between the mobile telephone and each of these cell site antennas can be determined by using the signal strength data. In one embodiment, the accuracy of these distance calculations is improved by varying estimated values in the distance equation in order to reduce the error component of the calculated distances. These reduced error distances are then used to calculate a location area estimate. In addition, the mobile location module receives the most recent GPS coordinates calculated by the GPS receiver/processor which are within a predetermined confidence level. These received GPS coordinates are compared with the calculated location area estimate to give a more accurate location area estimate.

These and other advantages of the invention will be apparent to those of ordinary skill in the art by reference to the following detailed description and the accompanying drawings.

BRIEF DESCRIPTION OF THE DRAWINGS

FIG. 10 is a flow diagram of the steps for calculating the location of a mobile telephone.

DETAILED DESCRIPTION

Figures 1, 3:
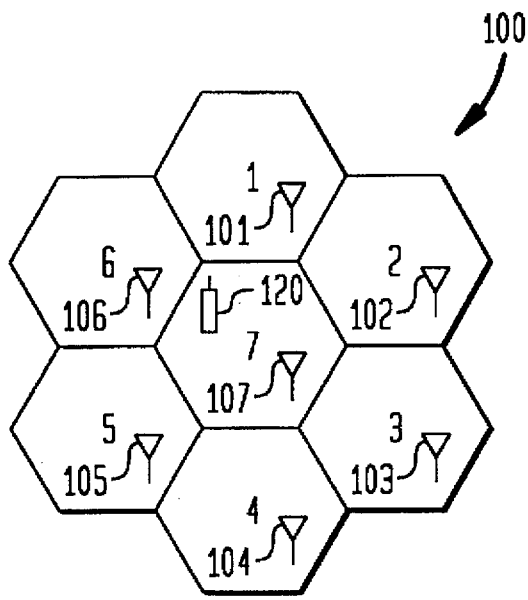
FIG. 1 shows the geographic serving area of a mobile telephone system.
FIG. 3 shows an example MAHO list.

FIG. 1 shows the geographic serving area 100 of a mobile telephone system. The serving area 100 is shown having 7 hexagonal cells numbered 1-7. Cell 7 is shown in the center, surrounded by adjacent cells 1-6. The serving area 100 of a mobile telephone system would typically contain more than 7 cells, however, for ease of reference, only 7 cells are shown in FIG. 1. Each cell 1-7 contains an antenna 101-107 which is used to transmit signals to, and receive signals from, mobile telephones, e.g. mobile telephone 120, within the mobile telephone system serving area 100.

Figure 2:
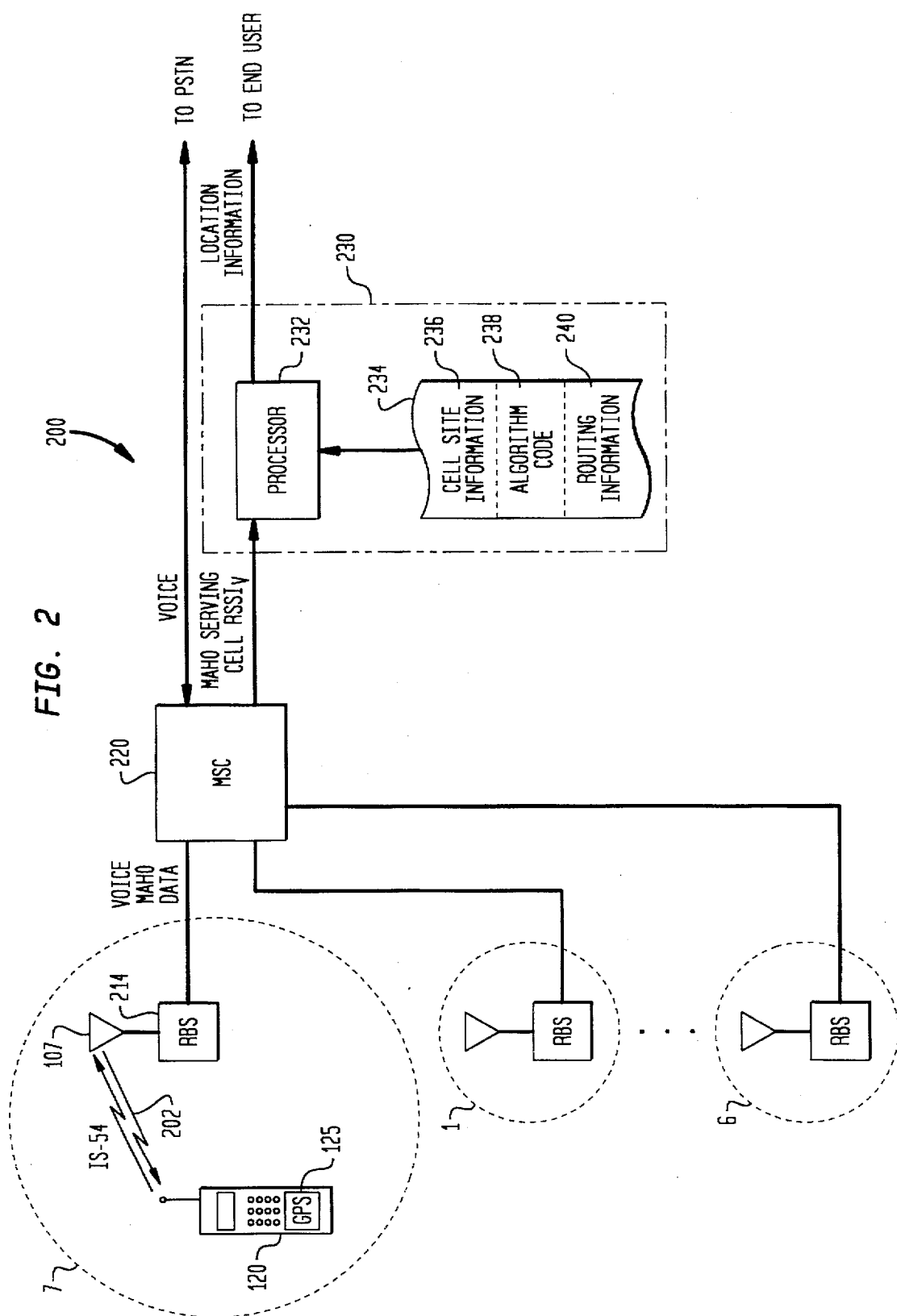
FIG. 2 shows a mobile telephone system in accordance with one embodiment of the present invention.

A mobile telephone system 200 in accordance with one embodiment of the present invention is shown in FIG. 2. Cell 7 is shown containing antenna 107 connected to a radio base station (RBS) 214. The mobile telephone 120 shown within cell 7 communicates with the mobile telephone system 200 via an air interface 202. In an advantageous embodiment, the mobile telephone 120 is a digital mobile telephone which operates according to the Noah American Time Division Multiple Access (TDMA) system IS-55 standard, and the air interface is described by the IS-54 and IS-136 standards. See, TIA/EIA Interim Standard IS-55-A, "Recommended Minimum Performance Standards of 800 MHz Mode Mobile Stations", September 1993; EIA/TIA Interim Standard IS-54-B "Cellular System Dual-Mode Mobile Station—Basestation Compatibility Standard", April, 1992; EIA/TIA Interim Standard IS-136 "Cellular System Dual-Mode Mobile Station—Basestation: Digital Control Channel Compatibility Standard", April, 1995; which are incorporated by reference herein. In addition, a GPS (global positioning satellite) receiver/processor unit 125 is required as a component in the mobile telephone 120 which is to be located. This use of the GPS receiver/processor 125 in the mobile telephone 120 will be described in further detail below. Each cell 1-7 within the mobile telephone system serving area 100 contains an antenna connected to a RBS. Each RBS is connected to the mobile switching center (MSC) 220.

Each cell 1-7 has assigned to it a plurality of voice channels for transmitting and receiving voice signals, and one control channel for transmitting and receiving control data signals. Referring to FIGS. 1 and 2, consider mobile telephone 120 which is operating in cell 7. The mobile telephone 120 is communicating over the air interface 202 with the mobile telephone system 200 via antenna 107 and RBS 214. Voice signals are communicated between the mobile telephone 120 and the antenna 107 via one of the cell's voice channels, and control data signals are communicated between mobile telephone 120 and the antenna 107 via the cell's control channel. In such a situation, cell 7 is the serving cell since the voice data is being communicated through that cell. In addition to the communication with the serving cell, the mobile telephone 120 also monitors the control channels of nearby cells. The mobile telephone 120, in accordance with the IS-54 and IS-136 standards, measures the signal strengths of these control channels of nearby cells. These control channel signal strength measurements are sent to the MSC 220 as described in further detail below. In addition, the mobile telephone 120 measures the signal strength of the voice signal it is receiving from the serving cell site antenna. This voice channel signal strength measurement is periodically sent by the mobile telephone 120 to the MSC 220 via the serving cell's reverse voice channel.

As the mobile telephone 120 travels within the geographic serving area 100, the signal strength of the voice channel signal between the antenna 107 and the mobile telephone 120 will vary. As the mobile telephone 120 enters another cell, for example adjacent cell 5, the signal strength of the control channel signal from antenna 105 will become stronger than the signal strength of the voice channel signal from antenna 107. At this point, it is desirable for the mobile telephone 120 to terminate communication over the voice channel with cell 7 and to initiate communication via a voice channel of cell 5. This operation is called a hand-off, and is used to change the serving cell while the mobile telephone 120 is traveling within the geographic serving area 100 so that the mobile telephone 120 maintains voice channel communication via the antenna with the strongest signal. This hand-off operation is well known in the art of mobile telephone systems, and the details of the operation will not be discussed herein.

In mobile telephones which work with the IS-54 and IS-136 air protocols, this hand-off operation is assisted by the mobile telephone itself. Such a function is called mobile assisted hand-off (MAHO). The mobile telephone 120 maintains a MAHO list which contains the signal strengths of the signals that the mobile telephone 120 is receiving over the control channels of nearby cells. Each cell site has a predefined MAHO list. The MSC 220 stores these MAHO lists for each cell site and sends the appropriate list to the mobile telephone 120, depending on the serving cell site. These defined MAHO lists generally consist of the cells adjacent to the serving cell. For example, assuming that cell 7 is the serving cell, an example MAHO list 300 is shown in FIG. 3. The list of channels to measure and to include in the MAHO list is communicated to the mobile telephone 120 by the MSC 220. The list 300 contains an entry for each of the adjacent cells 1–6 in this illustration, with a corresponding signal strength (RSSI) which represents the signal strengths of the control channels broadcast by cells 1–6 as received by mobile telephone 120. Thus, $RSSI_1$ represents the control channel signal strength being received by the mobile telephone 120 from the antenna 101 in cell 1; $RSSI_2$ represents the control channel signal strength being received by the mobile telephone 120 from the antenna 102 in cell 2; etc.

MAHO measurements are periodically sent from the mobile telephone 120 to the MSC 220 via the serving cell's reverse voice channel. The contents of the MAHO list are determined by the IS-54 standard, and thus all digital mobile telephones which comply with this air protocol will maintain a MAHO list.

As discussed in the background of the invention, it is often desirable to determine the specific geographic location of a mobile telephone 120 within the geographic serving area 100. In accordance with one embodiment of the invention, a mobile location module (MLM) 230 is added to the mobile telephone system 200 to provide this function. The MLM 230 contains a processor 232 and a memory 234. The MLM 230 is connected to the MSC 220, and the location function of the MLM 230 is initiated by the MSC 220 as follows.

Upon initiation of a telephone call by the mobile telephone 120, the RBS 214 sends the MSC 220 the telephone number of the mobile telephone (the A number) and the telephone number of the telephone being called by the mobile telephone (the B number). For each call handled by the MSC 220, the MSC 220 is configured to perform an A/B number analysis to determine whether a location function is to be performed. For example, the MSC 220 can initiate the location function each time a mobile telephone dials 911. In addition, the mobile telephone system provider can offer this location function as a service to its customers. In this situation, if the user of the mobile telephone 120 dials a certain number, the MSC 220 can initiate the location function and the location of the mobile telephone could be communicated to the mobile telephone user. Further, the MSC 220 can determine whether a location function is required by referring to a user profile stored in the MSC 220. For example, a company which uses a fleet of vehicles may want a location function performed each time a call is initiated from one of its mobile telephones. As seen by these examples, by performing an A/B number analysis, the MSC 220 can initiate a location function based on various criteria. One skilled in the art would recognize that various other A/B number analyses could be performed to determine whether initiation of the location function is required. If the MSC 220 determines that a location function is required it initiates the location function in the MLM 230. Whether or not a location function is initiated, the voice portion of the signal is sent to the appropriate destination. For example, if the mobile telephone 120 called a land line telephone, then the voice signal is sent to the public switch telephone network (PSTN). Thus, calls which result in the initiation of a location function do not need to terminate at the MLM 230. Voice information may be transmitted to the appropriate location based upon the number dialed.

The location of a mobile telephone 120 within the geographic service area 100 is determined, in one embodiment, by the MLM 230 as follows. The MSC 220 passes the following information to the MLM 230:

the MAHO list 300 sent by the mobile telephone 120 containing $RSSI_{1-6}$;

identification of the cell site which is currently serving the mobile telephone 120; and the signal strength of the voice channel signal from the serving cell site, represented as $(RSSI_V)$, which is measured, and sent, by the mobile telephone 120.

The MLM processor 232 then executes computer program code 238 stored in memory 234. The computer program code 238 describes the location algorithm to be performed by the processor 232. This algorithm is shown in the flow diagram of FIG. 10. The first step 1002 is to calculate two location zones, zone 1 and zone 2. Zone 1 is defined by the geographic coverage area of the cell currently serving the mobile telephone 120. For example, if the serving cell was cell 7 (see FIG. 1) then zone 1 would be the geographic coverage area included in cell 7. Zone 2 is calculated by the MLM 230 as described below in conjunction with FIGS. 4–8.

The first step in calculating zone 2 is to evaluate $RSSI_V$ and $RSSI_{1-6}$ to determine the three strongest signal strengths. For the present example, assume that cell 7 is the serving cell and the strongest signal strengths are the voice channel signal strength $(RSSI_V)$ being communicated over antenna 107, the signal strength associated with the control channel for cell 2 $(RSSI_2)$ being communicated over antenna 102, and the signal strength associated with the control channel for cell 4 $(RSSI_4)$ being communicated over antenna 104.

Using these signal strengths, it is possible to estimate the distance of the mobile telephone 120 from each of the antennas 102, 104, 107 using the following equation:

$$RSSI(dBm) = EIRP(dBm) - \text{Propagation Loss}(dB). \quad (1)$$

In the above equation, RSSI is the known signal strength being received by a mobile telephone from an antenna. EIRP is the effective isotropic radiated power of the antenna, and it depends on the power of the transmitter (TxPower) and the gain of the antenna (Antenna Gain), such that EIRP (dBm) =TxPower(dBm)+Antenna Gain(dBi). For each antenna 102, 104, 107, the TxPower (dBm) and the Antenna Gain (dBi) are fixed constants and thus the EIRP for each of the antennas is a known value. See, C. A. Balanis, "Antenna Theory: Analysis and Design", John Wiley & Sons, New York, 1982.

Figure 4:
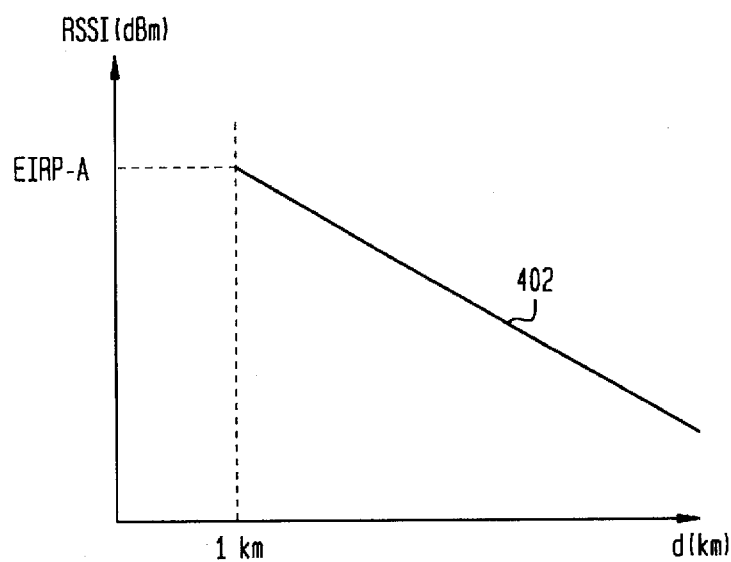
FIG. 4 illustrates the Hata propagation loss model.

The second term of equation (1), propagation loss, is modeled based upon the Hata model, which is illustrated in FIG. 4. The model is of the form:

$$\text{Propagation Loss}(dB) = A + B \log d$$

where A is the 1 Km intercept point which depends on the height of the antenna and the frequency being transmitted, and includes a component which is due to the antenna height above the ground. B is the propagation path slope, and d is the distance of the mobile telephone from the antenna (in kilometers). As shown in FIG. 4, EIRP(dBm)−A is the RSSI value of the line 402 at d=1 km, and B is the slope of the line 402. For further information on the Hata model see, M. Hata, "Empirical Formula for Propagation Loss in Land Mobile Radio Services", IEEE Transactions on Vehicular Technology, Vol. VT-29, No. 3, Aug. 1980.

Thus, equation (1) becomes:

$$RSSI = EIRP - (A + B \log d) \quad (2)$$

Solving for distance d:

$$d = 10^{\frac{1}{B}[EIRP-RSSI-A]} \quad (3)$$

In equation (3), EIRP is a known constant for each of the cell site antennas; the RSSI value is known based on measurements made by the mobile telephone 120; and the 1 km intercept point, A, is a known constant depending on the height of the antenna and the frequency being transmitted. Thus, the only unknown in equation (3) is the propagation path slope B. It is known that B is environment dependent and is generally bound as:

20 dB/dec (line of sight) $\leq B \leq$ 45 dB/dec (heavy urban).

Typically, propagation path slope is given in terms of terrain and building density. Typically categories are:

Suburban: B=30
Urban: B=35
Downtown: B=40

Thus, by estimating the value of B for each antenna, the distances $d_2$, $d_4$, and $d_7$ of the mobile telephone 120 from antennas 102, 104, 107 respectively, can be calculated as follows:

$$d_2 = 10^{\frac{1}{B_2}[EIRP_2-RSSI_2-A_2]} \quad (4)$$

$$d_4 = 10^{\frac{1}{B_4}[EIRP_4-RSSI_4-A_4]} \quad (5)$$

$$d_7 = 10^{\frac{1}{B_7}[EIRP_7-RSSI_7-A_7]} \quad (6)$$

where $EIRP_n$ is the effective isotropic radiated power of the antenna in cell n, $A_n$ is the 1 km intercept point between the mobile telephone 120 and cell n, and B is the estimated propagation path slope of the environment in cell n.

Figure 5:
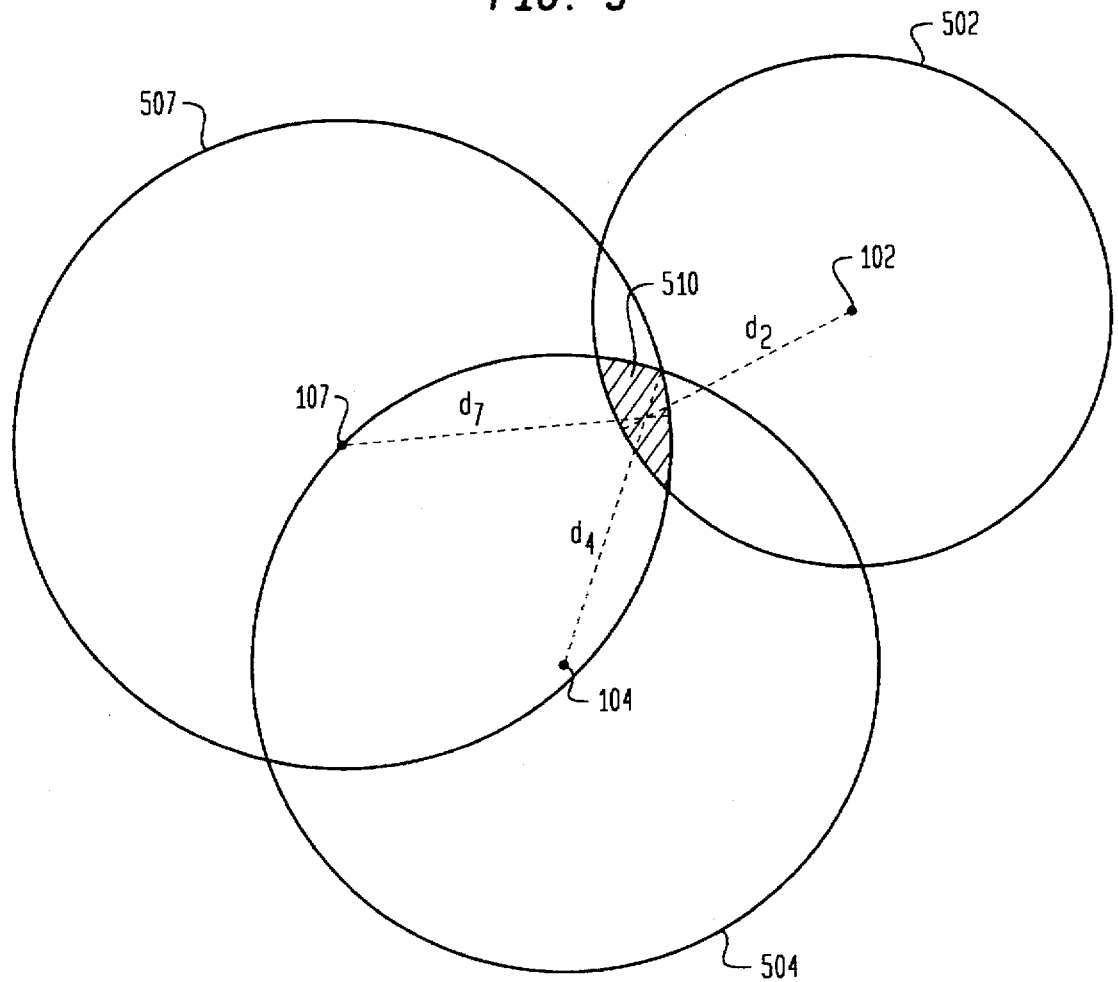
FIG. 5 illustrates a location area as the intersection of circles where the radii of the circles are overestimates.

After the distances $d_2$, $d_4$, and $d_7$ are calculated, a location area is determined by plotting the following circles, as illustrated in FIG. 5:

a circle 502 of radius $d_2$ centered at antenna 102;
a circle 504 of radius $d_4$ centered at antenna 104; and
a circle 507 of radius $d_7$ centered at antenna 107.

The intersection area 510 of circles 502, 504, 507 estimates the location of the mobile telephone 120 within the geographic serving area 100. Since the values or $B_2$, $B_4$ and $B_7$ are estimates, the resulting distances $d_2$, $d_4$ and $d_7$ will have a certain error component based upon the estimate of B. The calculated distances d2, d4 and d7 will have other error components as well, based upon cell characteristics other than propagation path slope. Examples of such cell characteristics are the relative height of the mobile telephone to each cell site antenna and the gain reduction due to antenna pattern rolloff. The algorithm described herein does not take these other error components into account. However, one skilled in the art could readily modify the described algorithm to account for these error components. In FIG. 5, $d_2$, $d_4$ and $d_7$ are overestimates of the distance of the mobile telephone 120 from each of the antennas 102, 104 and 107, and thus the resulting location can only be determined to be within area 510.

Figure 6:
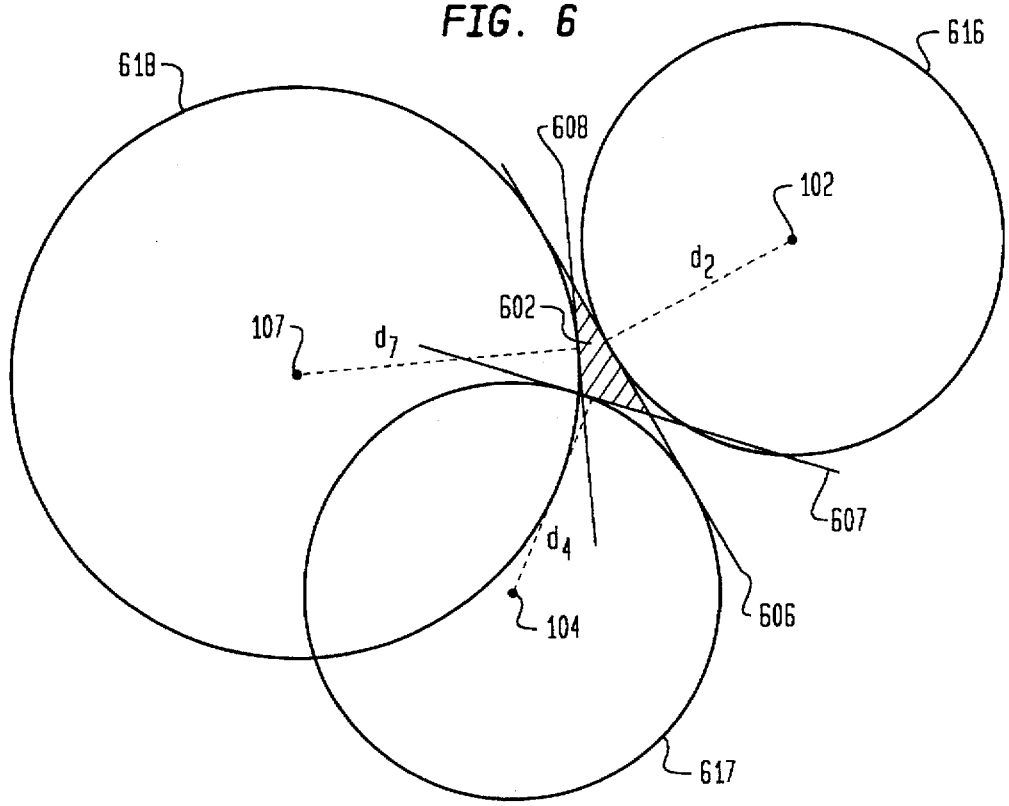
FIG. 6 illustrates a location area as the intersection of circles where the radii of the circles are underestimates.

It is also possible that the resulting distances $d_2$, $d_4$ and $d_7$ would be underestimates of the distance of the mobile telephone 120 from each of the antennas 102, 104 and 107. Such a case is illustrated in FIG. 6, in which the location estimate is within area 602. The area 602 is delimited by drawing the three lines 606, 607, and 608, which are tangent to the circles 616, 617, and 618 respectively. These three lines 606, 607, and 608 are adjusted such that they define a triangle of reduced area. The area defined by such a triangle is the location estimate area shown in FIG. 6 as area 602.

Figure 7:
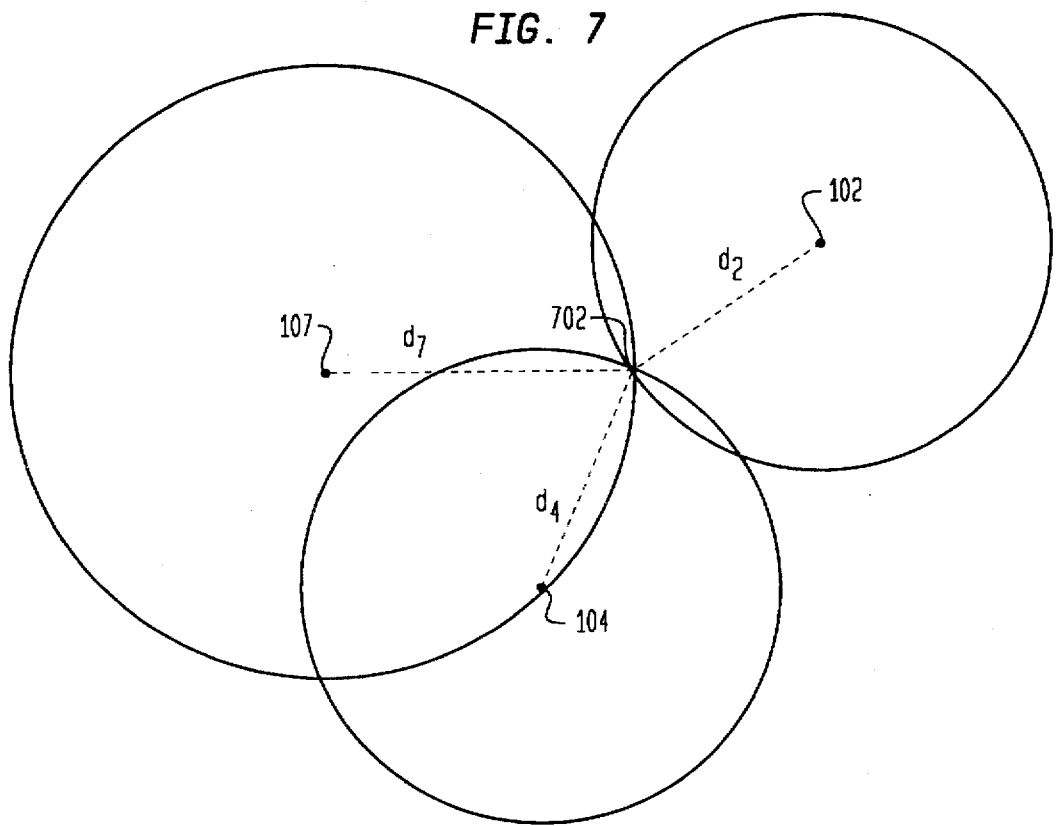
FIG. 7 illustrates a location point as the intersection of circles where the radii of the circles are accurately estimated.

If the resulting distances $d_2$, $d_4$ and $d_7$ are accurate estimates of the distance of the mobile telephone 120 from each of the antennas 102, 104 and 107, then the drawn circles would intersect at a point. Such a case is illustrated in FIG. 7, in which the location estimate is shown as point 702.

Since the only variable in the distance equation is the propagation path slope B, it is possible to improve the accuracy of the location estimate by varying the estimates or $B_2$, $B_4$ and $B_7$ to reduce the error component of the calculated distances $d_2$, $d_4$ and $d_7$.

Figure 8:
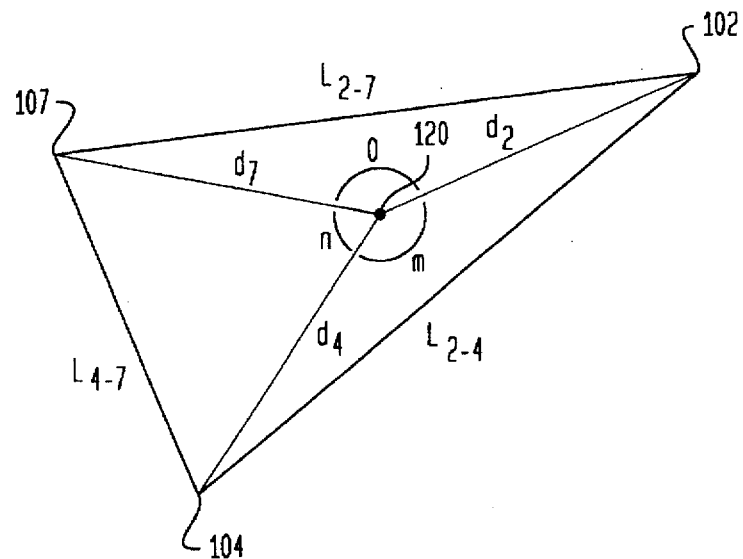
FIG. 8 illustrates the basis for the technique for reducing the error components of computed distances in accordance with the present invention.

The basis for this technique is illustrated in FIG. 8. Lines which represent the distance between antennas 102, 104, and 107 are drawn. Line $L_{2-7}$ represents the distance between antennas 102 and 107. Line $L_{2-4}$ represents the distance between antennas 102 and 104. Line $L_{4-7}$ represents the distance between antennas 104 and 107. The lengths of lines $L_{2-4}$, $L_{2-7}$, and $L_{4-7}$ are known because the locations (in latitude and longitude coordinates) of the cell site antennas are known. As before, the lines $d_2$, $d_4$ and $d_7$ represent the calculated distances of the mobile telephone 120 from each of the antennas 102, 104 and 107, respectively. From the law of cosines:

$$L_{2-4}^2 = d_2^2 + d_4^2 - 2d_2 d_4 \cos(m)$$

$$L_{2-7}^2 = d_2^2 + d_7^2 - 2d_2 d_7 \cos(o)$$

$$L_{4-7}^2 = d_4^2 + d_7^2 - 2d_4 d_7 \cos(n)$$

solving for the angles m, n, and o:

$$\angle m = \cos^{-1}\left[\frac{d_2^2 + d_4^2 - L_{2-4}^2}{2d_2 d_4}\right]$$

$$\angle n = \cos^{-1}\left[\frac{d_4^2 + d_7^2 - L_{4-7}^2}{2d_4 d_7}\right]$$

$$\angle o = \cos^{-1}\left[\frac{d_2^2 + d_7^2 - L_{2-7}^2}{2d_2 d_7}\right]$$

Referring again to FIG. 8, it is known that $\angle m + \angle n + \angle o = 360$ and thus $360 - (\angle m + \angle n + \angle o) = 0$. Now, substituting for the angles m, n, and o:

$$360 - \left[\cos^{-1}\left[\frac{d_2^2 + d_4^2 - L_{2-4}^2}{2d_2 d_4}\right] + \cos^{-1}\left[\frac{d_4^2 + d_7^2 - L_{4-7}^2}{2d_4 d_7}\right] + \cos^{-1}\left[\frac{d_2^2 + d_7^2 - L_{2-7}^2}{2d_2 d_7}\right]\right] = 0 \quad (7)$$

The calculation of the distances $d_2$, $d_4$ and $d_7$ will be most accurate when each of the terms of equation 7 re positive and when the left side of the equation equals 0. The only variables in the calculations of $d_2$, $d_4$ and $d_7$ are the propagation path slopes $B_2$, $B_4$ and $B_7$, respectively, which values are generally bound as: 20 dB/dec $\leq B \leq$ 45 dB/dec. Thus, the values $d_2$, $d_4$ and $d_7$ are calculated using equations 4, 5, and 6 while varying the propagation path slopes $B_2$, $B_4$, and $B_7$ between 20 dB/dec and 45 dB/dec. The resulting distances $d_2$, $d_4$ and $d_7$ are then used to evaluate equation 7. The values of $d_2$, $d_4$ and $d_7$ for which the result of equation 7 is closest to 0 with all its terms positive gives values for $d_2$, $d_4$ and $d_7$ with reduced error components.

When the distances $d_2$, $d_4$ and $d_7$ which have the reduced error components are found, the location area of the mobile telephone 120 is determined by plotting appropriate circles as described above. The geographic location (i.e. latitude and longitude) of antennas 102, 104, 107 in the geographic serving area 100 are known and, in one embodiment, are stored as cell site-information 236 in the memory 234 of the MLM 230. The MLM 230 uses these known cell site locations to determine the geographic location of the estimated location area using techniques which are well known in the art. For example, the actual geographic location of the mobile telephone can then be determined by plotting the estimated location area on a geographic map. This calculated location area is the zone 2 location.

As discussed above, a GPS (global positioning satellite) receiver/processor unit 125 is required as a component in the mobile telephone 120 which is to be located. As is well known in the art, a GPS receiver/processor receives signals from satellites orbiting the earth and translates these signals into latitude and longitude coordinates of the position of the GPS receiver/processor. A typical GPS receiver/processor is accurate to within approximately 50 feet. The MLM 230 uses information provided by the GPS receiver in the mobile telephone 120 to increase the accuracy of the geographic location estimate.

A known problem with GPS receivers is that location accuracy requires line of sight communication with multiple satellites. Thus, they do not return accurate latitude and longitude coordinates if the line of sight is blocked, for example, inside a building. The present invention accounts for this limitation by using the last GPS coordinate position which is within a predefined confidence level. This is accomplished by using a calculated average latitude and longitude position, along with a latitude and longitude error as follows.

Figure 9:
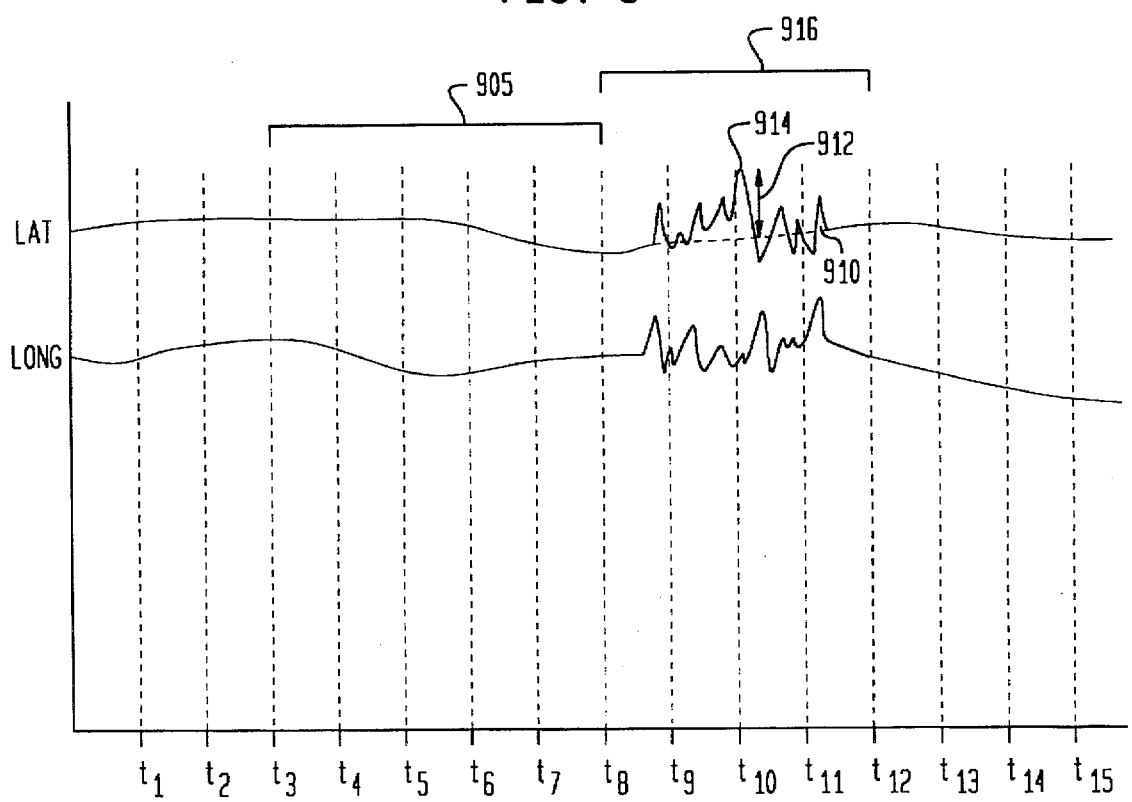
FIG. 9 shows a graph of the latitude and longitude coordinates calculated by a GPS receiver/processor over a time interval.

FIG. 9 shows a graph of the latitude and longitude coordinates calculated by a GPS receiver/processor 125 over time intervals ($t_{1-15}$). At each time interval $t_n$, the GPS receiver/processor 125 calculates the current coordinates of the mobile telephone 120. At time $t_n$, the latitude coordinate is represented by Lat($t_n$) and the longitude coordinate is represented by Long($t_n$). The coordinates Lat($t_n$) and Long($t_n$) calculated by the GPS receiver/processor 125 will generally vary smoothly over time. However, if the line of sight to the satellites is blocked, for example if the mobile telephone 120 enters a building, the calculated coordinates will not be accurate. This is illustrated in FIG. 9 at intervals $t_{8-12}$.

The GPS receiver/processor 125 is configured to compute the average of the latitude and longitude coordinates over a predetermined sliding time window, where the average latitude and longitude for the window ending at time period $t_n$ is represented as Lat_Avg($t_n$) and Long_Avg($t_n$) respectively. The length of the sliding time window is programmed into the GPS receiver/processor 125, and can vary depending on, for example, the desired accuracy and/or particular application. If this sliding time window is defined as N time periods, then the average coordinates for the time window ending at time $t_n$ is:

$$\text{Lat\_Avg}(t_n) = \frac{1}{N} \sum_{x=n-N+1}^{n} \text{Lat}(t_x)$$

$$\text{Long\_Avg}(t_n) = \frac{1}{N} \sum_{x=n-N+1}^{n} \text{Long}(t_x)$$

Note that prior to using the latitude and longitude coordinates in the mathematical computations described herein, the coordinates must be converted from the form {degree, minutes, seconds} to {degree.decimal}. In other words, the minute and second components of the coordinates must be converted to a decimal in terms of the degree component. Such a calculation is straightforward and could be readily implemented by one skilled in the art.

The values of Lat_Avg($t_n$) and Long_Avg($t_n$) are continuously computed by the GPS receiver/processor 125 at each successive time period. For example, if the time period of the sliding time window N is set to 5 time periods, then the time window ending at time period $t_8$ is shown in FIG. 9 at 905. The values of Lat_Avg($t_8$) and Long_Avg($t_8$) would be calculated by the GPS receiver/processor 125 at time $t_8$ as follows:

$$\text{Lat\_Avg}(t_8) = \frac{1}{5} \sum_{x=4}^{8} \text{Lat}(t_x)$$

$$\text{Long\_Avg}(t_8) = \frac{1}{5} \sum_{x=4}^{8} \text{Long}(t_x)$$

In addition to the average coordinates, the GPS receiver/processor 125 also calculates a peak error of the latitude and longitude coordinates during the time window. The peak error for the latitude coordinate for the time window ending at time $t_n$ is represented as Error_Lat($t_n$), and the peak error for the longitude coordinate for the time window ending at time $t_n$ is represented as Error_Long($t_n$). These peak errors are calculated by comparing the instantaneous latitude and longitude coordinates for each time period during the time window with the average coordinates of the time window as follows:

$$\text{Error\_Lat}(t_n) = \max\{|\text{Lat}_{n-N+1} \ldots {_n}-(\text{Lat\_Avg}(t_n))|\}$$

$$\text{Error\_Long}(t_n) = \max\{|\text{Long}_{n-N+1} \ldots {_n}-(\text{Long\_Avg}(t_n))|\}$$

For example, to calculate the peak error for the time window ending at time $t_8$, the calculation would be:

$$\text{Error\_Lat}(t_8) = \max\{|\text{Lat}_4 \ldots {_8}-(\text{Lat\_Avg}(t_8))|\}$$

$$\text{Error\_Long}(t_8) = \max\{|\text{Long}_4 \ldots {_8}-(\text{Long\_Avg}(t_8))|\}$$

Thus, the instantaneous latitude coordinates Lat($t_4$), Lat($t_5$), Lat($t_6$), Lat($t_7$), and Lat($t_8$) are compared with Lat_Avg($t_8$), and the largest deviation from the average latitude is the peak latitude error. Similarly, the instantaneous longitude coordinates Long($t_4$), Long($t_5$), Long($t_6$), Long($t_7$), and Long($t_8$) are compared with Long_Avg($t_8$), and the largest deviation from the average longitude is the peak longitude error. As an illustration, consider the time window 916 ending in time period $t_{12}$, in FIG. 9. The value of Lat_Avg($t_{12}$) is represented by the line 910. The largest deviation from line 910 is the instantaneous latitude Lat($t_{10}$) represented at point 914. Thus, the peak error Error_Lat($t_{12}$) during time window 916 is represented as the distance 912 between Lat($t_{10}$) 914 and Lat_Avg($t_{12}$) 910.

The GPS receiver/processor 125 uses the error values of Error_Lat($t_n$) and Error_Long($t_n$) to store the last reliable coordinates in storage registers as follows. These storage registers may be memory locations in the GPS processor/receiver. Alternatively, these storage registers may be memory locations in a separate memory unit which is accessible by the GPS receiver/processor 125. At each time interval $t_n$, the GPS receiver/processor 125 compares the peak error values Error_Lat($t_n$) and Error_Long($t_n$) with programmed error thresholds Err_Thresh_Lat and Err_Thresh_Long. As with the programmable sliding time window, these thresholds can vary depending on the desired accuracy and/or particular application. These thresholds are defined such that if the peak error values Error_Lat($t_n$) and Error_Long($t_n$) are within the thresholds Err_Thresh_Lat and Err_Thresh_Long respectively, then it can be assumed that the instantaneous coordinate values Lat($t_n$) and Long($t_n$) are within acceptable reliability limits. At each time period $t_n$, if the peak errors of both the latitude and longitude are within the threshold values, then the instantaneous coordinate values are stored in memory registers Lat_reg and Long_reg respectively. If the peak errors for either the latitude and longitude are not within the threshold values, then the instantaneous coordinate values Lat($t_n$) and Long($t_n$) are not stored in memory registers Lat_reg and Long_reg respectively. This technique assures that the memory registers Lat_reg and Long_reg always contain the most recent reliable latitude and longitude coordinates.

In addition to the information sent by the mobile telephone 120 described above, the following GPS information is sent over the air interface 202 to the mobile telephone system 200 during each time period $t_n$:

Lat($t_n$) and Long($t_n$);
Lat_reg and Long_reg;
Error_Lat($t_n$) and Error_Long($t_n$); and
Err_Thresh_Lat and Err_Thresh_Long.

The MSC 220 operates as described above to initiate the location function of the MLM 230 under certain conditions. The algorithm 238 stored in memory 234 of MLM 230 instructs the processor 232 to operate as described below in conjunction with FIG. 10. Thus, upon initiation of the location function, the MLM 230 operates according to the flow diagram of FIG. 10 to calculate the location of the mobile telephone 120.

As discussed above, zone 1 is defined by the geographic coverage area of the cell currently serving the mobile telephone 120 and zone 2 is the location area calculated by the MLM 230 as described above in conjunction with FIGS. 4-8. Zone 1 will generally define an area larger than zone 2. Referring to FIG. 10, in step 1004 the MLM 230 determines if the peak latitude and longitude error values for the current time window are within the predetermined threshold error values. If they are, then the instantaneous latitude and longitude coordinates Lat($t_n$) and Long($t_n$) are considered to be of acceptable accuracy and they are used for further processing in step 1012. In step 1012 it is determined whether the instantaneous GPS coordinates define a location which is within zone 1. If not, then the MLM 230 returns the zone 2 location estimate with a moderate confidence level in step 1010. If step 1012 determined that the instantaneous GPS coordinates define a location which is within zone 1, then in step 1020 it is determined whether the instantaneous GPS coordinates define a location which is within zone 2. If they do, then the MLM 230 returns the instantaneous coordinates as the location estimate with a high confidence level in step 1024. If the instantaneous GPS coordinates do not define a location which is within zone 2, then the MLM 230 returns the instantaneous coordinates as the location estimate with a moderate confidence level in step 1018.

If in step 1004 the MLM 230 determines that the peak latitude and longitude error values for the current time window are not within the predetermined threshold error values, then the instantaneous latitude and longitude coordinates Lat($t_n$) and Long($t_n$) are considered not to be of acceptable accuracy, and the latitude and longitude values stored in the memory registers Lat_reg and Long_reg are used for further processing in step 1006. In step 1006 it is determined whether the GPS coordinates stored in the memory registers define a location which is within zone 1. If not, then the MLM 230 returns the zone 2 location estimate with a low confidence level in step 1008. If the GPS coordinates stored in the memory registers define a location which is within zone 1, then in step 1014 it is determined whether the GPS coordinates stored in the memory registers define a location which is within zone 2. If not, then the MLM 230 returns the memory register coordinates as the location estimate with a moderate confidence level in step 1016. If the GPS coordinates stored in the memory register define a location which is within zone 2, then the MLM 230 returns the memory register coordinates as the location estimate with a high confidence level in step 1022.

Once the geographic location area is determined, the MLM 230 routes the information to the appropriate end user destination. The appropriate routing information 240, in one embodiment, is stored in memory 234 of the MLM 230. For example, if the location function was initiated because of a 911 call from the mobile telephone 120, the MLM 230 will route the location information to the appropriate public service provider. If the location function was initiated because the MSC determined that the cellular telephone number belonged to a fleet company, the location information would be sent to the appropriate fleet company. Further, the location information could be communicated to the mobile telephone 120 itself if the request for location information came from the user of the mobile telephone 120.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the present invention could be implemented using a geometric location technique other than that described herein. Further, the detailed description described a method for calculating a location estimate by using three signal strengths. However, the principles of the present invention could be extended to perform such a calculation using more than three signal strengths. Such an extension could be readily implemented by one of ordinary skill in the art given the above disclosure.

We claim:

1. A method for locating a mobile telephone within the geographic serving area of a mobile telephone system, wherein said mobile telephone is capable of sending signals to and receiving signals from antennas located in cells within the geographic serving area, and wherein said mobile telephone comprises a GPS receiver/processor, the method comprising the steps of:

receiving signal strength data representing the signal strengths of signals being received by the mobile telephone from a first plurality of antennas;

calculating a first location area of the mobile telephone as the geographic coverage area of a serving cell cite;

calculating a second location area of the mobile telephone using said signal strength data;

receiving GPS coordinates representing a GPS location of the mobile telephone; and comparing the first and second calculated location areas with the GPS location to determine the location of said mobile telephone.

2. The method of claim 1 wherein said step of calculating a second location area further comprises the steps of:

calculating the distances between the mobile telephone and each of a second plurality of antennas using said signal strength data; and calculating the intersection area of a plurality of circles, each of said circles having a center at the location of one of said second plurality of antennas and having a radius equal to the calculated distance between the mobile telephone and the antenna.

3. The method of claim 2 wherein said first plurality of antennas and said second plurality of antennas are the same.

4. The method of claim 2 wherein said step of calculating the distances between the mobile telephone and each of a second plurality of antennas further comprises the steps of:

a) calculating the distances between the mobile telephone and each of a second plurality of antennas using said signal strength data and a propagation path slope estimate for each of the second plurality of antennas, wherein each of said calculated distances contains an error component which depends upon said propagation path slope estimate; and b) repeating step a) while varying the propagation path slope estimates to reduce said error components.

5. The method of claim 2 wherein said signal strengths are dependent, at least in part, on a cell propagation characteristic, and wherein said step of calculating the distances between the mobile telephone and each of a second plurality of antennas further comprises the steps of:

a) calculating the distances between the mobile telephone and each of a second plurality of antennas using said signal strength data and estimated cell propagation characteristic values, wherein each of said calculated distances contains an error component which depends upon an estimated cell propagation characteristic value; and b) repeating step a) while varying the estimated cell propagation characteristic values to reduce said error components.

6. The method of claim 5 wherein said estimated cell propagation characteristic is propagation path slope.

7. The method of claim 5 wherein said estimated cell propagation characteristic is antenna pattern rolloff.

8. The method of claim 1 wherein said received GPS coordinates are the most recent GPS coordinates calculated by the GPS receiver/processor which are within a predetermined confidence level.

9. The method of claim 1 further comprising the step of notifying a user of the location of the mobile telephone.

10. The method of claim 1 further comprising the step of: assigning a confidence level to said determined location based on said step of comparing.

11. An apparatus for locating a mobile telephone within the geographic serving area of a mobile telephone system, wherein said mobile telephone is sending signals to and receiving signals from antennas located within the geographic serving area, and wherein said mobile telephone comprises a GPS receiver/processor, the apparatus comprising:

a processor executing stored instructions for performing the functions of:

calculating the distances between the mobile telephone and each of a plurality of antennas using received signal strength data representing the signal strengths of the signals being received by the mobile telephone from the plurality of antennas;

calculating a first location area of the mobile telephone as the geographic coverage area of a serving cell cite;

calculating a second location area of the mobile telephone using said calculated distances; and comparing the first and second location areas with received GPS coordinates representing a GPS location of the mobile telephone to determine the location of said mobile telephone.

12. The apparatus of claim 11 wherein said processor function of calculating a second location area further comprises the function of:

calculating the second location as the intersection area of a plurality of circles, each of said circles having a center at the location of one of said plurality of antennas and having a radius equal to the calculated distance of the mobile telephone from the antenna.

13. The apparatus of claim 11 wherein said received GPS coordinates are the most recent GPS coordinates which are within a predetermined confidence level.

14. The apparatus of claim 11 wherein said processor further performs the function of:

assigning a confidence level to said determined location based on said function of comparing.

15. A method for locating a mobile station within the geographic serving area of a mobile communication system, wherein said mobile station is capable of sending signals to and receiving signals from antennas located in cells within the geographic serving area, and wherein said mobile station comprises a GPS receiver/processor, the method comprising the steps of:

receiving signal strength data representing the signal strengths of signals being received by the mobile station from a first plurality of antennas;

calculating a first location area of the mobile station as the geographic coverage area of a serving cell cite;

calculating a second location area of the mobile station using said signal strength data;

receiving GPS coordinates representing a GPS location of the mobile station; and comparing the first and second calculated location areas with the GPS location to determine the location of said mobile station.

16. The method of claim 15 wherein step of calculating a second location area further comprises the steps of:

calculating the distances between the mobile station and each of a second plurality of antennas using said signal strength data; and calculating the intersection area of a plurality of circles, each of said circles having a center at the location of one of said second plurality of antennas and having a radius equal to the calculated distance between the mobile station and the antenna.

17. The method of claim 16 wherein said first plurality of antennas and said second plurality of antennas are the same.

18. The method of claim 16 wherein said step of calculating the distances between the mobile station and each of a second plurality of antennas further comprises the steps of:

a) calculating the distances between the mobile station and each of a second plurality of antennas using said signal strength data and a propagation path slope estimate for each of the second plurality of antennas, wherein each of said calculated distances contains an error component which depends upon said propagation path slope estimate; and b) repeating step a) while varying the propagation path slope estimates to reduce said error components.

19. The method of claim 16 wherein said signal strengths are dependent, at least in part, on a cell propagation characteristic, and wherein said step of calculating the distances between the mobile station and each of a second plurality of antennas further comprises the steps of:

a) calculating the distances between the mobile station and each of a second plurality of antennas using said signal strength data and estimated cell propagation characteristic values, wherein each of said calculated distances contains an error component which depends upon an estimated cell propagation characteristic value; and b) repeating step a) while varying the estimated cell propagation characteristic values to reduce said error components.

20. The method of claim 19 wherein said estimated cell propagation characteristic is propagation path slope.

21. The method of claim 19 wherein said estimated cell propagation characteristic is antenna pattern rolloff.

22. The method of claim 15 wherein said received GPS coordinates are the most recent GPS coordinates calculated by the GPS receiver/processor which are within a predetermined confidence level.

23. The method of claim 15 further comprising the step of notifying a user of the location of the mobile station.

24. The method of claim 15 wherein said mobile station is a mobile telephone.

25. The method of claim 15 wherein said mobile station is a mobile data device.

26. The method of claim 15 further comprising the step of:

assigning a confidence level to said determined location based on said step of comparing.

27. An apparatus for locating a mobile station within the geographic serving area of a mobile communication system, wherein said mobile station is sending signals to and receiving signals from antennas located within the geographic serving area, and wherein said mobile station comprises a GPS receiver/processor, the apparatus comprising:

a processor executing stored instructions for performing the functions of:

calculating the distances between the mobile station and each of a plurality of antennas using received signal strength data representing the signal strengths of the signals being received by the mobile station from the plurality of antennas;

calculating a first location area of the mobile station as the geographic coverage area of a serving cell cite;

calculating a second location area of the mobile station using said calculated distances; and comparing the first and second location areas with received GPS coordinates representing a GPS location of the mobile station to determine the location of said mobile station.

28. The apparatus of claim 27 wherein said processor function of calculating a second location area further comprises the function of:

calculating the second location as the intersection area of a plurality of circles, each of said circles having a center at the location of one of said plurality of antennas and having a radius equal to the calculated distance of the mobile station from the antenna.

29. The apparatus of claim 27 wherein said received GPS coordinates are the most recent GPS coordinates which are within a predetermined confidence level.

30. The apparatus of claim 27 wherein said mobile station is a mobile telephone.

31. The apparatus of claim 27 wherein said mobile station is a mobile data device.

32. The apparatus of claim 27 wherein said processor further performs the function of:

assigning a confidence level to said determined location based on said function of comparing.

* * * * *